United States Patent [19]

Gassman et al.

[11] 4,287,656
[45] Sep. 8, 1981

[54] METHOD OF SETTING FASTENING ELEMENTS IN A HARD RECEIVING MATERIAL

[75] Inventors: Horst-Detlef Gassman, Schaan; Ernst Wohlwend, Nendeln, both of Liechtenstein

[73] Assignee: Hilti Aktiengesellschaft, Fürstentum, Liechtenstein

[21] Appl. No.: 92,543

[22] Filed: Nov. 8, 1979

[30] Foreign Application Priority Data

Nov. 13, 1978 [DE] Fed. Rep. of Germany ....... 2849139

[51] Int. Cl.³ .............................................. B23P 11/00
[52] U.S. Cl. .................................... 29/432; 29/526 R; 227/9; 227/27; 227/119; 227/139; 411/440; 52/704
[58] Field of Search ................. 29/432, 526 R; 227/9, 227/10, 11, 27, 110, 119, 139; 411/440, 441

[56] References Cited

U.S. PATENT DOCUMENTS

| | | | |
|---|---|---|---|
| 1,448,236 | 3/1923 | Riney | 52/704 X |
| 1,947,839 | 2/1934 | Fissell | 29/432 X |
| 2,160,794 | 5/1939 | Price | 52/704 X |
| 2,400,878 | 5/1946 | Dunn | 29/432 |
| 2,563,479 | 8/1951 | Miles | 29/432 UX |
| 2,576,473 | 11/1951 | Meyers | 29/432 |
| 3,129,429 | 4/1964 | Hilti | 227/10 |
| 3,160,188 | 12/1964 | Frank | 29/432 UX |
| 3,382,751 | 5/1968 | Kopf | 227/10 X |
| 3,588,996 | 6/1971 | McMaster et al. | 29/432 |
| 4,165,946 | 8/1979 | Andersson | 227/9 X |

*Primary Examiner*—Charlie T. Moon
*Attorney, Agent, or Firm*—Toren, McGeady & Stanger

[57] ABSTRACT

Fastening elements, such as bolts, studs or nails, are inserted into a hard receiving material, such as concrete or rock, first, by drilling a blind borehole into the receiving material. The diameter of the borehole is formed so that it is greater than the diameter of the leading end of the fastening element. A setting device containing the fastening element is then aligned with the blind borehole and the fastening element is driven into the receiving material. The fastening element enters the receiving material at the base of the blind borehole. The length of the fastening element inserted into the receiving material is at least half the axial length of the borehole and may have a length considerably greater than the axial length of the borehole.

6 Claims, 3 Drawing Figures

METHOD OF SETTING FASTENING ELEMENTS IN A HARD RECEIVING MATERIAL

SUMMARY OF THE INVENTION

The present invention is directed to a method of setting fastening elements, such as bolts, nails and studs, into a hard receiving material, such as concrete and rock.

In attaching items to a receiving material two methods have been used, one the so-called direct fastening and the other where the attachment involves a drilling operation. In direct fastening, a fastening element is driven into the receiving material by a force generated by an explosive powder charge. This method is very economical and affords savings in the time required which result in savings in cost. This method, however, has certain limitations in its use. If the direct fastening is to be made into a receiving material of higher strength, an increasing number of failures must be expected. When the fastening element is driven in, the receiving material is displaced and high compressive stresses usually develop, particularly at the surface of the receiving material. These stresses can cause the surface of the receiving material to warp. Moreover, crater-like breakout portions may develop around the point of insertion of the fastening element into the receiving material. When load is applied to the fastening element, it is usually pulled out along with a conically shaped breakout portion of the receiving material.

In the method involving drilling, a borehole is produced in the receiving material and, subsequently, an expansion dowel is anchored in the borehole. The anchoring of the dowel in the borehole is effected by screwing in a fastening screw or driving in a spreading or expanding member. As a result, this second type of fastening is much more cumbersome than the direct fastening method.

Therefore, it is the primary object of the present invention to provide a simple and economical method of setting fastening elements, such as bolts, nails and studs, in a hard receiving material, such as concrete and rock, where the possibility of developing breakout portions in the receiving material is avoided along with the related disadvantageous effects.

In accordance with the present invention, the method of inserting fastening elements involves, initially, forming a blind borehole in the receiving material and, subsequently, driving a fastening element into the receiving material through the borehole using an explosive powder-operated setting device.

By driving the fastening element into the base of a previously drilled blind borehole, the zone of penetration of the fastening element into the receiving material is shifted from its surface into its interior. The zone of penetration is also the region where the highest compressive stresses are developed as a result of the displaced receiving material. Accordingly, the compressive stresses are reduced in the direction toward the surface of the receiving material. The breakout portions normally experienced where fastening elements are driven directly into the surface of the receiving material, are avoided. When a load is applied to the inserted fastening element, the zone of highest stress is not located at the surface, but rather in the interior of the receiving material. Accordingly, a breakout portion will not suddenly develop in the surface of the receiving material when an excess load is applied. On the contrary, the fastening element exhibits a so-called slipping behavior, as is known from the use of expansion dowels or anchors. Therefore, when a certain laod is reached, the anchoring value will not suddenly drop to zero, rather it will experience a gradual decrease along a so-called slippage path.

To achieve the optimum effect, though the fastening element is inserted through the borehole, it must penetrate into the receiving material for a sufficient depth so that it is adequately anchored. In practice, it has been found to be advantageous if the fastening element is driven into the receiving material for an axial length in the range of 0.5 to 2.5 times the axial length of the blind borehole. When the fastening element is driven into the receiving material for such a depth, a sufficient anchoring value of the fastening element is attained without generating compressive stresses at the surface of the receiving material.

Up to the present time, the fastening elements used have had relatively large shank diameters. Such diameters are necessary, on one hand, because of the bending stress developed when a transverse load is applied to the fastening element, with the bending stress being highest in the region of the surface of the receiving material. On the other hand, the pressure on the surface of the hole in the receiving material formed by the fastening element which is generated when a transverse load is applied, may not exceed a certain value. The large shank diameter of the fastening element, however, results in a high resistance against the penetration of the element into the receiving material. In the method embodying the present invention, it is advantageous if the shank portion of the fastening element which is driven into the receiving material is smaller in diameter than the trailing portion of the shank. As a result of the reduced shank diameter of the leading end portion of the fastening element, a smaller driving force provided by the setting device is sufficient.

To prevent an significant bending of the fastening element shank in the event high transverse loads are applied to it, it is advantageous if the diameter of the blind borehole is approximately the same as the diameter of the trailing end of the fastening element. Accordingly, the fastening element can be supported by the receiving material in the range of the blind borehole. A blind borehole having a diameter approximately the same as the diameter of the trailing end of the shank is also visually more advantageous.

To facilitate the fastening element being driven concentrically through the borehole, it is preferable if the explosive powder-operated setting device is aligned relative to the borehole by a centering device. The centering device may consist, for example, of projections, fingers or the like, which engage the blind bore and ensure a centered insertion of the fastening element.

There is also the possibility that the barrel of the setting device, or the base plate surrounding the barrel, can be provided with appropriate markings which are aligned relative to a system of coordinates provided on the receiving material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
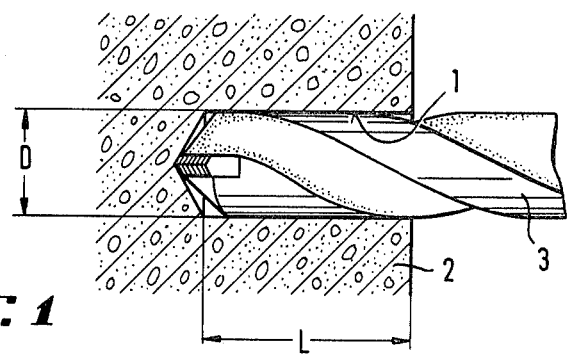
FIG. 1 is a side view, partly in section, illustrating the formation of a blind borehole in the receiving material.

In FIG. 1 a blind borehole 1 is shown being formed in a receiving material 2 by means of a rock drill 3. The diameter D of the blind borehole 1 is approximately the same as the larger diameter trailing end portion of the fastening element which is to be driven into the borehole. The axial length L of the blind borehole 1 corresponds approximately to the intended length of penetration of the fastening element. To drill the desired length L of the blind borehole 1 without using any special means on the supporting device, such as a drill bit stop or the like, it is advantageous to use a stepped drill. Further, a stepped drill can also be used for producing a countersunk portion of the borehole providing a recess for centering the setting device.

Figure 2:
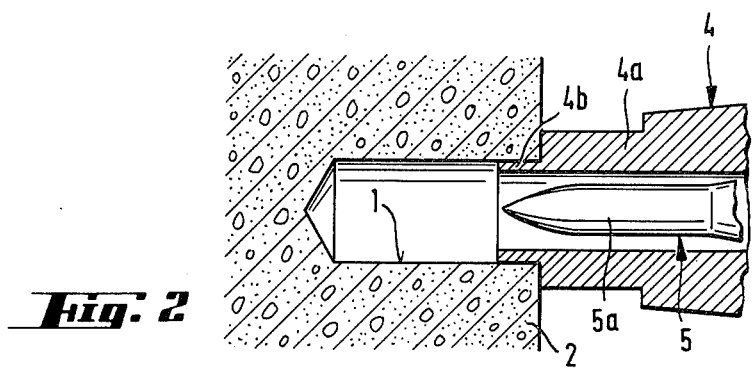
FIG. 2 is a view similar to FIG. 1 showing the centering of the setting device in the prepared blind borehole.

In FIG. 1 the forward or muzzle end portion of a setting device 4 is illustrated with its barrel 4a bearing against the surface of the receiving material 2. At the leading end of the barrel 4a there is a centering device 4b in the form of a sleeve. The sleeve or centering device 4b projects into the opening into the blind borehole 1. The centering device 4b serves to align the setting device 4 relative to the blind borehole 1. Instead of the illustrated sleeve, the centering device 4b could be formed by individual pins which extend into the blind borehole 1. Furthermore, it is also possible to align the barrel 4a relative to the blind borehole 1 by means of markings on the barrel 4a and a system of coordinates indicating the center of the blind borehole on the surface of the receiving material. A fastening element 5 is shown inserted into the barrel 4a of the setting device 4, only the leading end portion of the fastening element is shown in FIG. 2.

Figure 3:
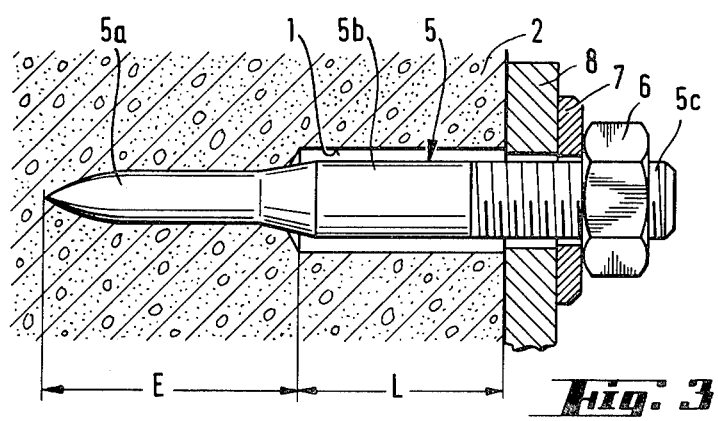
FIG. 3 is a side view, partly in section, similar to FIGS. 1 and 2, illustrating the completed insertion of the fastening element in accordance with the present invention.

In its fully inserted condition as illustrated in FIG. 3, the fastening element 5 has been driven into the receiving material in accordance with the method of the present invention. The leading end of the fastening element commences its movement into the receiving material at the base of the blind borehole 1. The axial length or depth of penetration E of the fastening element corresponds approximately to the length L of the blind borehole 1. The leading end shank portion 5a of the fastening element has a smaller diameter as compared to the trailing end shank portion 5b. As shown, the full axial length of the leading end portion 5a is driven into the receiving material while the trailing end shank portion 5b is located within the blind borehole 1 and extends outwardly from the borehole and from the surface of the receiving material. As a result of the smaller diameter shank of the leading end portion 5a, the compressive stresses generated in the receiving material 2 as the fastening element is driven in, are reduced. Additionally, these compressive stresses are reduced, relative to the surface of the receiving material 2 by the axial depth or length of the blind borehole 1. The trailing end of the fastening element, that is, the end of the trailing end shank portion 5b which projects out of the borehole, has a threaded portion 5c. A bracket or plate 8 is fastened to the surface of the receiving material 2 by a washer 7 and a nut 6 screwed onto the thread 5c. Since the leading end shank portion 5a of the fastening element, which serves to anchor it into the receiving material, is spaced from the surface of the receiving material, between the nut 6 serving for applying load, and the leading end shank portion 5a anchored in the receiving material, an expansion zone is created which facilitates initial tensioning of the fastening element 5. In cases of extreme transverse loads, the trailing end shank portion 5b can be supported in the blind borehole 1, so that the bending length of the fastening element is not increased due to the inward displacement of the anchoring zone for the element.

While specific embodiments of the invention have been shown and described in detail to illustrate the application of the inventive principles, it will be understood that the invention may be embodied otherwise without departing from such principles.

What is claimed is:

1. Method of setting fastening elements, such as bolts, nails and studs, in a hard receiving matrial, such as concrete and rock, comprising the steps of drilling a blind borehole into the receiving material, aligning an explosive powder-operated setting device containing a fastening element with the blind borehole, and driving the fastening element from the setting device through the blind borehole and into the receiving material.

2. Method, as set forth in claim 1, including the steps of providing the leading end portion of the fastening element with a diameter smaller than the diameter of the blind borehole, and driving the fastening element into the receiving material so that it enters the receiving material at the base of the blind borehole.

3. Method, as set forth in claim 2, including the step of drilling the blind borehole for an axial length amounting to a significant portion of the axial length of the fastening element to be inserted and driving the fastening element into the receiving material for an axial length equal to 0.5 to 2.5 times the axial length of the blind borehole.

4. Method, as set forth in claims 1, 2 or 3, including the step of forming the fastening element with an axially extending leading end portion and an axially extending trailing end portion and providing the leading end portion with a diameter smaller than the diameter of the trailing end portion and smaller than the diameter of the blind borehole.

5. Method, as set forth in claim 4, including the step of drilling the blind borehole with a diameter corresponding approximately to the diameter of the trailing end portion of the fastening element.

6. Method, as set forth in claim 5, including the step of centering the muzzle end of the setting device in the entrance into the borehole located in the surface of the receiving material.

* * * * *